United States Patent [19]
Clarke

[11] Patent Number: 5,274,291
[45] Date of Patent: Dec. 28, 1993

[54] ROTARY TRANSFORMER WITH MULTIPLE ANGULARLY ADJUSTABLE STATORS

[76] Inventor: Patrick W. Clarke, 244 Sagamore Dr., Murray Hill, N.J. 07974

[21] Appl. No.: 833,297

[22] Filed: Feb. 10, 1992

Related U.S. Application Data

[63] Continuation-in-part of Ser. No. 763,983, Sep. 23, 1991, Pat. No. 5,194,773, which is a continuation-in-part of Ser. No. 763,955, Sep. 23, 1991, Pat. No. 5,200,659, which is a continuation-in-part of Ser. No. 462,059, Jan. 8, 1990, abandoned.

[51] Int. Cl.$^5$ .............. H02K 21/04; H02K 23/02; H02K 01/12
[52] U.S. Cl. .............. 310/112; 310/116; 310/254
[58] Field of Search .............. 310/111, 112, 116, 199, 310/184, 211, 254; 322/100; 336/115, 122, 123, 126

[56] References Cited

U.S. PATENT DOCUMENTS

| | | | |
|---|---|---|---|
| Re. 12,793 | 5/1912 | Wells, Jr. | 307/47 |
| 977,328 | 11/1910 | Richter | 307/47 |
| 996,762 | 7/1911 | Hertwig et al. | 307/47 |
| 1,014,373 | 1/1912 | Bijur | 307/47 |
| 1,139,294 | 5/1915 | Johnson | 307/47 |
| 1,246,643 | 11/1917 | Neuland . | |
| 1,708,909 | 4/1929 | Spencer . | |
| 2,308,863 | 1/1943 | Crzymer | 336/122 |
| 2,871,438 | 1/1959 | Annis | 322/13 |
| 3,242,365 | 3/1966 | Kober | 310/268 |
| 3,280,400 | 10/1966 | Roe | 318/243 |
| 3,290,574 | 12/1966 | Roe | 318/214 |
| 3,405,296 | 10/1968 | Stilley et al. | 310/116 |
| 3,435,315 | 3/1969 | Kordik et al. | 318/239 |
| 3,586,938 | 6/1971 | Le Gall | 318/166 |
| 3,812,417 | 5/1974 | Keitz | 322/55 |
| 3,940,668 | 2/1976 | Apsit et al. | 318/226 |
| 4,087,698 | 5/1978 | Myers | 307/84 |
| 4,144,468 | 3/1979 | Mourier | 310/72 |
| 4,177,414 | 12/1979 | Roesel, Jr. et al. | 322/28 |
| 4,228,391 | 10/1980 | Owen | 322/35 |
| 4,229,689 | 10/1980 | Nickoladze | 322/32 |
| 4,345,230 | 8/1982 | Chass | 336/135 |
| 4,525,661 | 6/1985 | Mucsy et al. | 322/4 |
| 4,686,375 | 8/1987 | Gottfried | 290/2 |
| 4,785,213 | 11/1988 | Satake | 310/116 |
| 4,879,484 | 11/1989 | Huss | 310/114 |
| 4,920,293 | 4/1990 | Kanda | 310/116 |
| 4,945,296 | 7/1990 | Satake | 318/538 |
| 4,959,578 | 9/1990 | Varga | 310/268 |
| 5,051,639 | 9/1991 | Satake et al. | 310/112 |
| 5,068,559 | 11/1991 | Satake et al. | 310/112 |

FOREIGN PATENT DOCUMENTS

| | | |
|---|---|---|
| 32-4357 | 10/1957 | Japan .............. 310/114 |
| 49-86807 | 8/1974 | Japan .............. 310/114 |
| 54-29005 | 3/1979 | Japan . |
| 59-191461 | 10/1984 | Japan . |
| 62-260590 | 11/1987 | Japan . |

Primary Examiner—Steven L. Stephan
Assistant Examiner—D. R. Haszko
Attorney, Agent, or Firm—Weingarten, Schurgin, Gagnebin & Hayes

[57] ABSTRACT

A rotary transformer having a rotor assembly mounted on a shaft and a plurality of associated cooperative stators rotatably mounted about the rotor assembly. The stators are angularly adjustable, relative to each other, about the axis of the shaft. Electrical power is delivered to one of the stators (the primary stator), which functions as a primary of the transformer. The remaining stators (secondary stators) function as a secondary of the transformer. The relative angular orientation between the secondary stators determines the magnitude of the output voltage from the secondary stators.

6 Claims, 3 Drawing Sheets

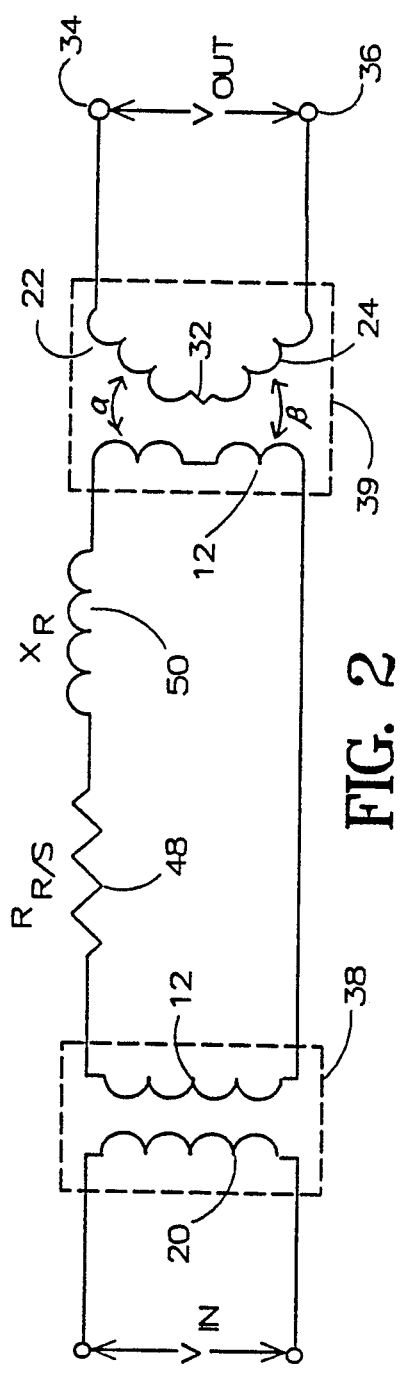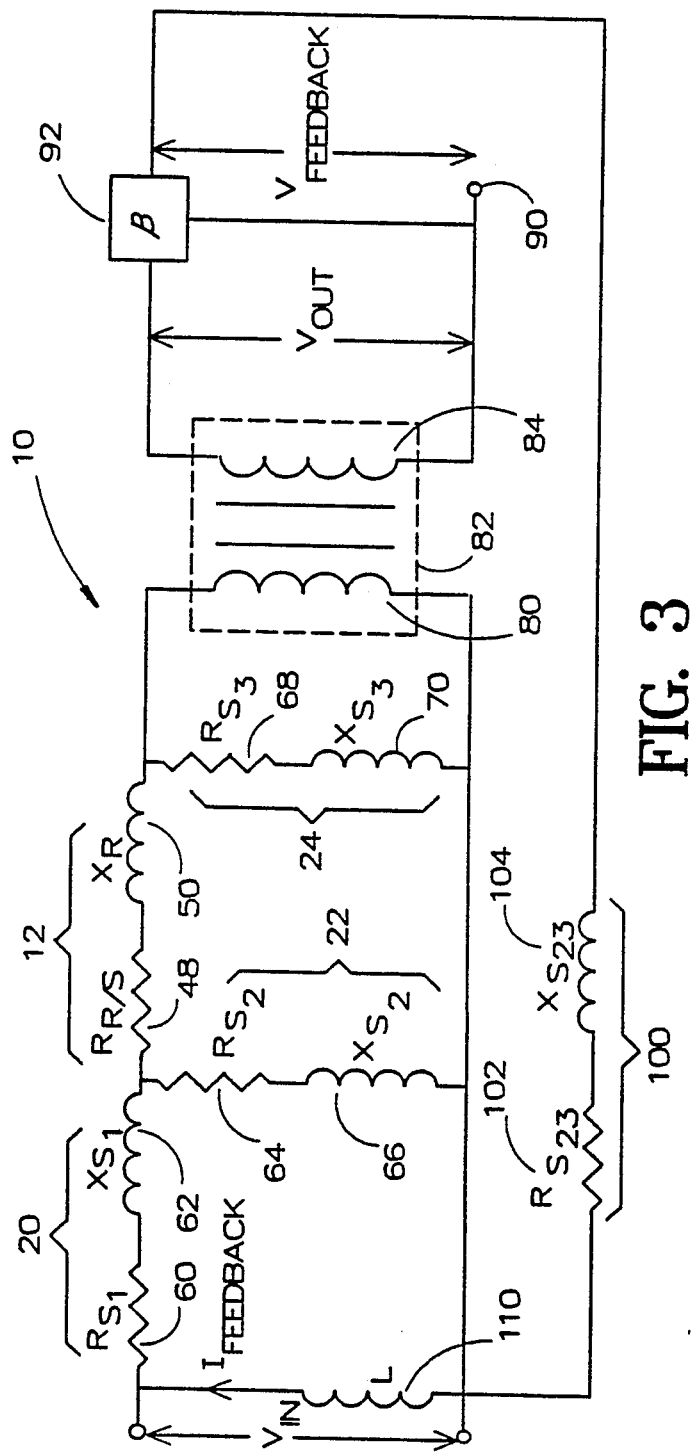
FIG. 2
FIG. 3

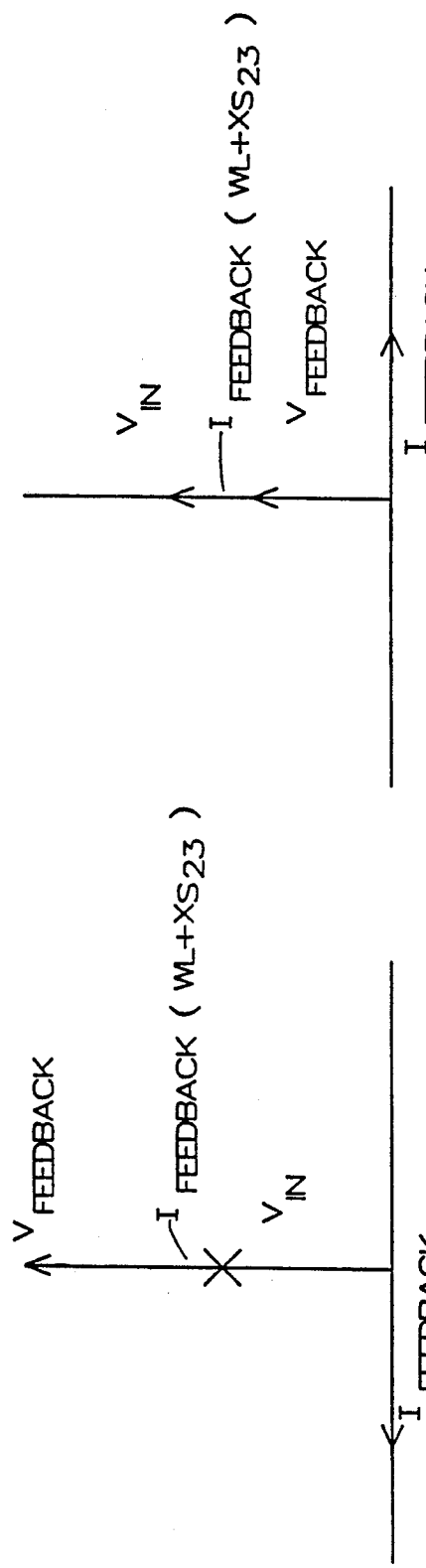
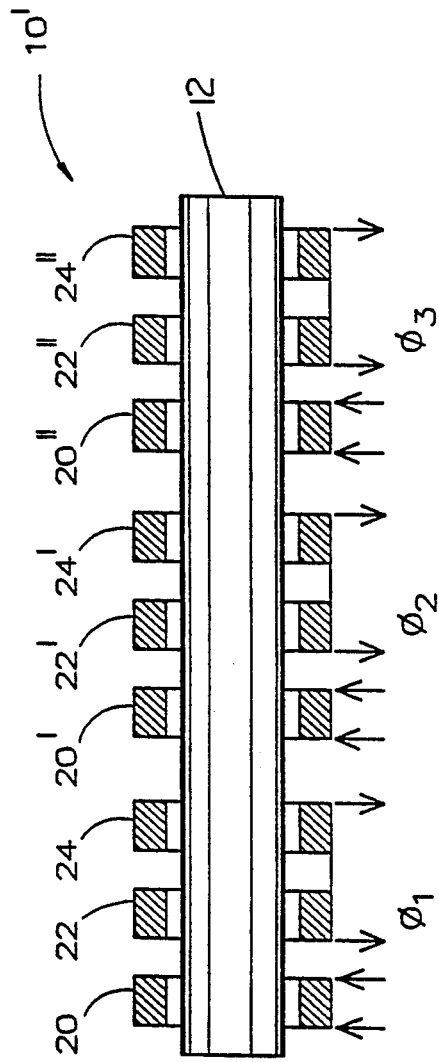
FIG. 4
FIG. 4(A)
FIG. 5

ROTARY TRANSFORMER WITH MULTIPLE ANGULARLY ADJUSTABLE STATORS

RELATED APPLICATION

This application is a continuation-in-part of application Ser. No. 07/763,983, filed Sep. 23, 1991, now U.S. Pat. No. 5,194,773, which is a continuation-in-part of application Ser. No 07/763,955, filed Sep. 23, 1991, now U.S. Pat. No. 5,200,659, which is a continuation-in-part of application Ser. No. 07/462,059, filed Jan. 8, 1990, now abandoned.

FIELD OF THE INVENTION

This invention relates to electrical transformers and more particularly to electrical transformers providing an adjustable output voltage.

BACKGROUND OF THE INVENTION

Electrical transformers have a primary coil which is connectable to an AC source and a secondary coil which is connectable to a load. The alternating current flowing in the primary coil generates a magnetic field which in turn induces current in the secondary coil. The voltage induced in the secondary coil is a function of the relative number of turns between the primary and secondary coils and the presence or absence of magnetizable material between the coils.

Variable transformers typically have a single coil acting both as the primary and secondary coils. In such transformers, the secondary coil is formed by a wiping contact which effectively changes the ratio of primary to secondary coil turns. Thus, by moving the wiper, the output voltage produced by the secondary coil is adjusted.

The present invention relates to a variable transformer which functions without the use of a wiping contact.

SUMMARY OF THE INVENTION

In accordance with the invention, a rotary transformer is provided having a rotor assembly mounted on a shaft and a plurality of associated cooperative stators mounted about the rotor assembly. The stators are angularly adjustable, relative to each other, about the axis of the shaft. Electrical power is delivered to one of the stators (the primary stator) which functions as a primary of the transformer. The remaining stators (the secondary stators) function as a secondary of the transformer. By adjusting the relative angular orientation between the secondary stators, the magnitude of the output voltage from the secondary stators may be adjusted.

BRIEF DESCRIPTION OF THE DRAWING

These and further features of the invention may be understood with reference to the accompanying specification and drawing in which:

FIG. 2 is a schematic diagram of an equivalent circuit to the embodiment of the transformer shown in FIG. 1;

FIG. 3 is a schematic diagram of an equivalent circuit to the embodiment of the transformer shown in FIG. 1 with power factor correction;

FIG. 4 is a current-voltage phase diagram of the embodiment of the transformer of FIG. 3 when the feedback voltage exceeds the input voltage;

FIG. 4A is a current-voltage phase diagram of the embodiment of the transformer of FIG. 3 when the input voltage exceeds the feedback voltage; and FIG. 5 is a cross section of an embodiment of the transformer of the invention for use in producing multiphase output voltages.

DETAILED DESCRIPTION

Figure 1:
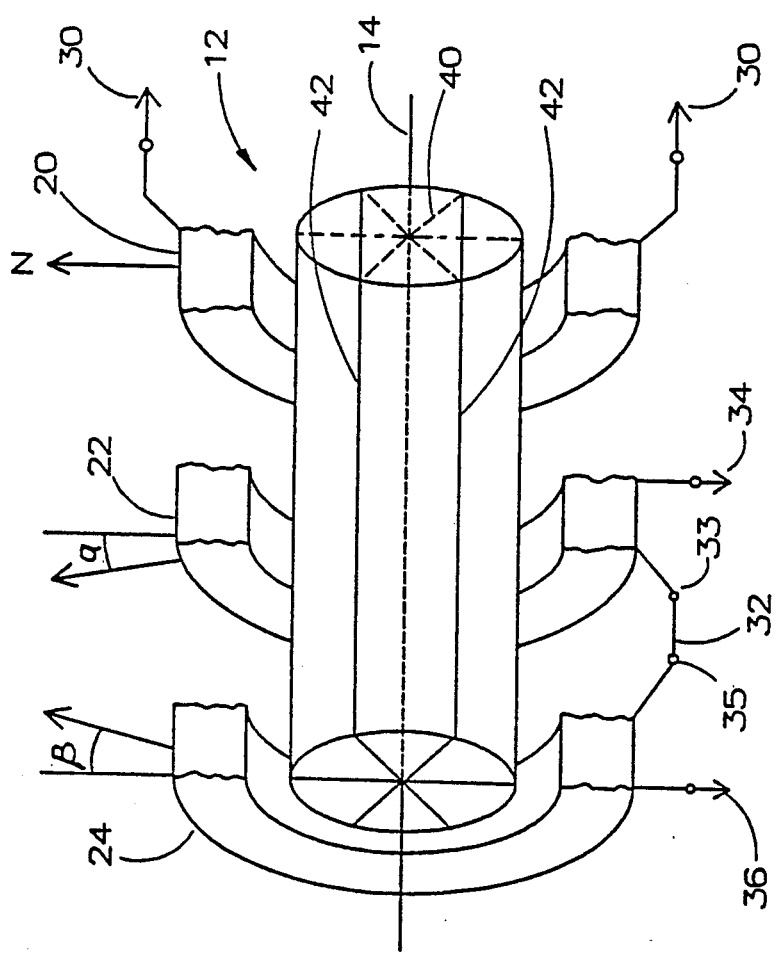
FIG. 1 is a perspective diagram of an embodiment of the transformer of the invention.

An embodiment of a rotary transformer 10 constructed in accordance with the invention is shown in FIG. 1. A rotor 12, rotatably mounted upon a shaft 14, is coaxially located within a first stator 20, a second stator 22 and a third stator 24. In the embodiment shown, the rotor 12 is configured as a squirrel cage rotor, but other forms of rotors may be used. In use, the windings of the first stator 20, the primary stator, are connected to an AC power supply 30, whereby the first stator 20 functions as the primary of the transformer 10. One terminal each of the second stator 22 and the third stator 24 (collectively the secondary stators) are connected together in series and the remaining terminal 34, 36 of each secondary stator 22, 24, respectively, is in communication with a load (not shown).

Each of the secondary stators 22, 24 is independently angularly adjustable about the shaft 14. The current in the first stator 20, acting as the primary of the transformer 10 generates a magnetic field which varies in time. In FIG. 1, the direction of the magnetic field generated by the coils of the stator at a given instant of time is designated by the vector N. This time varying magnetic field induces a current in the windings 14 of rotor 12. The induced current generates a magnetic field which tracks the field generated by the primary stator 20, causing the rotor 12 to rotate about the shaft 14.

The current flow through the conductors 42 of the rotor 12 generates a magnetic field about the rotor 12. As the rotor 12 rotates on shaft 14, the direction and strength of the magnetic field generated by the rotor 12 varies, thereby inducing currents in each of the secondary stators 22, 24. The amplitude of the voltages produced across the terminals 33, 34 and 35, 36 of each of the secondary stators 22, 24, respectively, varies with time. The phase relationship between the peak of the voltage generated in each of the secondary stators 22, 24 and the peak of the voltage in the primary stator 20, at any given time, is determined by the angular orientation of each of the secondary stators 22, 24 with respect to the primary stator 20.

In FIG. 1, the angular displacement of the orientation of the second stator 22 the second stator 22, as measured with respect to at which the output voltage produced by the second stator 22 is in phase with the primary stator 20, is designated α. That is, when the angular displacement of the second stator 22 is such that the output voltage of the second stator 22 is in phase with the primary stator 20, the angular displacement α is equal to zero. Likewise, the angular displacement of the third stator 24, as measured with respect to the orientation of the third stator 24 at which the output voltage produced by the third stator 24 is in phase with the primary stator 20 is designated β. Again, when the angular displacement of the third stator 24 is such that the output voltage of the third stator 24 is in phase with the primary stator 20, the angular displacement β is equal to zero. Thus, the value of the voltage, at any given time, generated by the second stator 22 across terminals 33, 34 will differ from the voltage generated by the third stator 24 across terminals 35, 36 by an amount related to the difference in the values of α and β. That is, if the physical characteristics of each of the two secondary stators 22, 24 are the same and α=β, the voltage produced across the terminals of second stator 22 will be equal to and in phase with the voltage produced across the terminals of the third stator 24. If α does not equal β, a voltage difference will occur. This voltage difference can be varied by changing the relative values of α and β by independently rotating the second stator 22 and the third stator 24 about the shaft 14.

Connecting each the secondary stators 22, 24 in series (by connecting one terminal 33 of the second stator 22 to one terminal 35 of the third stator 24 with a junction 32) results in a voltage appearing on the output terminals 34, 36 of each of the secondary stators 22, 24 which is the vector sum of the voltages induced in each of the secondary stator 22, 24. Thus by adjusting the relative angular orientation α, β of the stators 22, 24, respectively, the output voltage may be adjusted. By permitting the phase of the voltage $V_1$ induced in one of the secondary stators 22 or 24 to lead the voltage of the primary stator 20 and permitting the phase of the voltage $V_2$ induced in the other of the secondary stators 24 or 22 to lag the voltage of the primary stator 20, the output voltage may be varied continuously from 0 volts to $(V_1+V_2)$ volts. Although the embodiment shown has a fixed primary stator 20 and adjustable secondary stators 22, 24, alternatively, various combinations of stators 20, 22, 24 may be fixed or angularly adjustable. Pairs of additional secondary stators may be added and independently adjusted to provide additional secondary voltages.

FIG. 2 discloses a schematic diagram of an equivalent circuit to the transformer 10. In the schematic, $V_{in}$ is applied to the primary stator 20 acting as the primary of a transformer 38 whose secondary is the rotor 12. The rotor 12 has an intrinsic resistance 48 which is equal to the resistance $R_R$ of the rotor 12 divided by the slip S of the rotor 12 during rotation and an intrinsic impedance $(X_R)$ 50. The rotor 12 also acts as a primary of a second transformer 39 whose secondary is the combined stators 22, 24. The voltage produced across the secondary of transformer 39 is the output voltage $V_{out}$ of transformer 10.

FIG. 3 depicts the equivalent circuit schematic for a rotary transformer 10 with power factor correction. In this equivalent circuit, the primary stator 20 has an intrinsic resistance 60 of $R_{S1}$ and an intrinsic impedance 62 of $X_{S1}$, the second stator 22 has an intrinsic resistance 64 of $R_{S2}$ and an intrinsic impedance 66 of $X_{S2}$, and the third stator 24 has an intrinsic resistance 68 of $R_{S3}$ and an intrinsic impedance 70 of $X_{S3}$. The rotor 12 has an intrinsic resistance 48 which is equal to the resistance $R_R$ of the rotor 12 divided by the slip S of the rotor 12 (during rotation) and an intrinsic impedance 50 of $X_R$. The primary stator 20 and the rotor 12 form the primary 80 of an equivalent transformer 82. The second stator 22 and the third stator 24 form the secondary 84 of the transformer 82.

The output voltage $V_{output}$ of transformer 82 appears across the output terminals 90 of the secondary stators 22, 24. A phase shifter 92 introduces a phase shift β into the output voltage $V_{output}$ relative to the phase of the input voltage $V_{in}$. The phase shifter 92 is the equivalent of the phase shifting which actually results from the rotation of the secondary stators 20, 24 with respect to the primary stator 20. The phase shifted output voltage $V_{output}$ is then fed back into the voltage source $V_{in}$ through the collective resistance 102 $R_{S23}$ and collective impedance 104 $X_{S23}$ of the secondary stators 22, 24 and an external inductor L. The external inductor L may be supplied to compensate if the internal inductances of the stators are insufficient to provide the necessary power correction. By adjusting the phase shift β, the power fed back into the voltage source $V_{in}$ can be varied.

FIG. 4 depicts the phase relationship between the input voltage $(V_{in})$ of driving frequency ω, the feedback voltage $(V_{feedback})$, the feedback current $(I_{feedback})$ and voltage drop caused by the feedback current through the inductor (L) and the combined impedances $X_{S23}$ for the rotary transformer with power factor correction shown in FIG. 3, when the feedback voltage $(V_{feedback})$ exceeds the input voltage $(V_{in})$. Similarly, FIG. 4A depicts the same phase relationships when the feedback voltage $(V_{feedback})$ is less than the input voltage $(V_{in})$.

FIG. 5 depicts a rotary transformer 10' used to produce a three phase voltage output and having a plurality of primary stators 20, 20', 20'', and a plurality of secondary stators 22, 22', 22'', 24, 24', 24''. Each pair of secondary stators 22, 24; 22', 24'; and 22'', 24''; produces an individual output voltage which has a predefined phase relationship $\phi_1, \phi_2, \phi_3$, to the input voltage at its respective primary stator 20, 20', 20''. Such a three phase system has the added benefit that unbalanced loads across the output terminals of the secondary stators, 22,24; 22',24'; 22'',24''; will appear as balanced loads to the primary stators 20, 20', 20''. This is because energy is being transferred by the rotation of the rotor 12 which acts to average the output voltage loads.

It should be noted that in addition to load balancing, the rotor 12 also smooths voltage fluctuations in both the three phase and single phase embodiments. Smoothing occurs because the inertia of the rotor 12 acts to store energy and this in turn minimizes the effect of transient voltage fluctuations in the supply voltage, effectively increasing the isolation of the output terminals from the input terminals. It should also be noted that harmonic currents in the secondary stators 22, 24 of the transformer will be highly attenuated in the primary stator 20 of the transformer 10 because of the isolation produced by the rotor 12 as just described.

It is understood that other modifications or embodiments are possible which will still be within the scope of the appended claims. These and other examples of the concept of the invention illustrated above are intended by way of example and the actual scope of the invention is to be determined solely from the following claims.

What is claimed is:

1. A rotary transformer comprising:
    a rotor assembly mounted on a shaft;
    a first stator, a second stator and a third stator disposed in operative relation about said rotor assembly, each said stator comprising a plurality of windings;
    said stators being relatively angularly adjustable with respect to each other about said shaft to provide a predetermined relative angular displacement of one stator with respect to said other stators, said windings of said first stator being adapted for connection to an AC supply as a transformer primary, said windings of said second stator and said third stator being in series communication and being adapted for connection to a load as said transformer secondary;

said voltage supplied to said load being a function of the relative angular displacement among said first stator, said second stator and said third stator.

2. The rotary transformer of claim 1 wherein said rotor assembly comprises squirrel cage windings.

3. The rotary transformer of claim 1 wherein said first stator is fixed and said second stator and said third stator are angularly adjustable.

4. The rotary transformer of claim 1 wherein said transformer includes a fourth stator and a fifth stator, each of said fourth stator and said fifth stator comprising a plurality of windings, said first, said fourth and said fifth stators being relatively angularly adjustable with respect to each other about said shaft to provide a predetermined relative angular displacement of said fourth stator and said fifth stator with respect to said first stator, said windings of said fourth stator and said fifth stator being in series communication and being adapted for connection to a second load as a second transformer secondary;

said voltage supplied to said second load being a function of said relative angular displacement between said first stator, said fourth stator and said fifth stator.

5. A method of transforming a primary AC voltage to a secondary voltage of a predetermined value comprising the steps of:

disposing a rotor assembly on a shaft;

disposing a first stator, a second stator and a third stator in operative relation about said rotor assembly, said first stator being adapted as a transformer primary and said second stator and said third stator being in series communication and being adapted as a transformer secondary;

connecting said first stator to a primary AC voltage supply, adjusting the relative angular displacement of each said stator with respect to each other stator about said shaft to provide a predetermined relative angular displacement of one stator with respect to said other stators until said secondary voltage of said predetermined value is produced at said transformer secondary, said secondary voltage being a function of said relative angular displacement between said first stator, said second stator and said third stator.

6. A method of isolating a transformer primary from a transformer secondary comprising the steps of:

disposing a rotor assembly on a shaft;

disposing a first stator, a second stator and a third stator in operative relation about said rotor assembly, said first stator being adapted as said transformer primary and said second stator and said third stator being in series communication and being adapted as said transformer secondary;

connecting said first stator to a primary AC voltage supply, adjusting the relative angular displacement of each said stator with respect to each other stator about said shaft to provide a predetermined relative angular displacement of one stator with respect to said other stators until a secondary voltage of a predetermined value is produced at said transformer secondary, said secondary voltage being a function of said relative angular displacement between said first stator, said second stator and said third stator.

* * * * *

UNITED STATES PATENT AND TRADEMARK OFFICE
CERTIFICATE OF CORRECTION

PATENT NO. : 5,274,291
DATED : December 28, 1993
INVENTOR(S) : Patrick W. Clarke It is certified that error appears in the above-indentified patent and that said Letters Patent is hereby corrected as shown below:

Column 2, lines 53-54, "of the orientation of the second stator 22 the second stator 22" should read --of the second stator 22--.

Column 2, line 55, "respect to at" should read --respect to the orientation of the second stator 22 at--.

Signed and Sealed this

Fourteenth Day of June, 1994

Attest:

BRUCE LEHMAN

*Attesting Officer*      Commissioner of Patents and Trademarks